United States Patent
Gorday et al.

(10) Patent No.: US 6,707,826 B1
(45) Date of Patent: Mar. 16, 2004

(54) METHOD AND APPARATUS FOR WIRELESS BANDWIDTH EFFICIENT MULTI-WAY CALLING

(75) Inventors: Paul Edward Gorday, West Palm Beach, FL (US); Sunil Satyamurti, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/531,292

(22) Filed: Mar. 20, 2000

(51) Int. Cl.[7] .................................................. H04J 3/16
(52) U.S. Cl. ....................... 370/468; 370/494; 455/416
(58) Field of Search ................................. 370/310, 293, 370/352, 294, 295, 401, 328, 465, 241, 468, 252, 467, 240, 470, 471, 494, 495, 493, 331, 544, 260, 335, 263, 262, 267, 280, 254, 351; 455/416

(56) References Cited

U.S. PATENT DOCUMENTS

| | | | |
|---|---|---|---|
| 5,881,053 A | * | 3/1999 | Kimball ...................... 370/260 |
| 5,896,565 A | | 4/1999 | Miller |
| 6,104,726 A | * | 8/2000 | Yip et al. .................... 370/468 |
| 6,185,525 B1 | * | 2/2001 | Taubenheim et al. ....... 704/211 |
| 6,424,637 B1 | * | 7/2002 | Pecen et al. ................. 370/328 |
| 6,563,807 B1 | * | 5/2003 | Kim et al. ................... 370/331 |

* cited by examiner

*Primary Examiner*—Chi Pham
*Assistant Examiner*—Alexander O. Boakye
(74) *Attorney, Agent, or Firm*—Randi L. Karpinia

(57) ABSTRACT

A bandwidth efficient method of wireless communication among simultaneous multiple users includes the steps of monitoring (102) for voice activity from a plurality of sources (302 or 304) on a channel and detecting voice activity (107) among the plurality of sources during a predetermined time period. If voice activity is detected from only a first source, then code the voice activity from the first source and transmit a full-rate packet of data (109) to a wireless subscriber (50). If voice activity is detected from at least a first source and a second source amounting to N sources, then code such N sources using a 1/N-rate vocoder to obtain N different 1/N rate data packets (112) and combining (114) the N 1/N-rate data packets from at least the first source and the second source before transmitting (116) a full packet of data to the wireless subscriber.

13 Claims, 4 Drawing Sheets

METHOD AND APPARATUS FOR WIRELESS BANDWIDTH EFFICIENT MULTI-WAY CALLING

FIELD OF THE INVENTION

The present invention is directed to multi-way calling, and more particularly to a bandwidth efficient method and apparatus capable of handling multiple simultaneous callers in a wireless communication system.

BACKGROUND OF THE INVENTION

Typical three-way calling having at least one mobile wireless subscriber is either typically bandwidth inefficient or poor in voice quality or both. Such inefficiencies can be illustrated in a digital communication system where a three-way call needs to be set up between a mobile user "M" and two other users "A" and "B". Users "A" and "B" can either be mobile units, PSTN users or Voice-over-Internet Protocol (VoIP) users. Focusing on M's wireless connection to a base station, a three-way call can be set-up simply by allocating two downlink channels (one for "A" and one for "B") and allocating one uplink channel for the mobile user "M". The disadvantage of this approach is that it requires 1.5 times the bandwidth as a normal two-way conversation.

An alternative to the example above is to convert signals "A" and "B" back into analog voice waveforms, add the waveforms, and then re-code the composite waveform into a single downlink channel. This solves the bandwidth efficiency problem of the method above, but it adds additional complexity to the system in terms of the decoding and then re-coding of the voice information. Furthermore, Very Low Bit-rate (VLB) vocoders do not perform well when the input waveform consists of more than one voice. Therefore, combining the two voices from "A" and "B" followed by re-coding of the signal would degrade the call quality.

Thus a need exists for a bandwidth efficient method and apparatus that would allow for multi-party calls, preferably using a VLB adjustable vocoder with minimal impact on voice quality.

DETAILED DESCRIPTION

Figure 1:
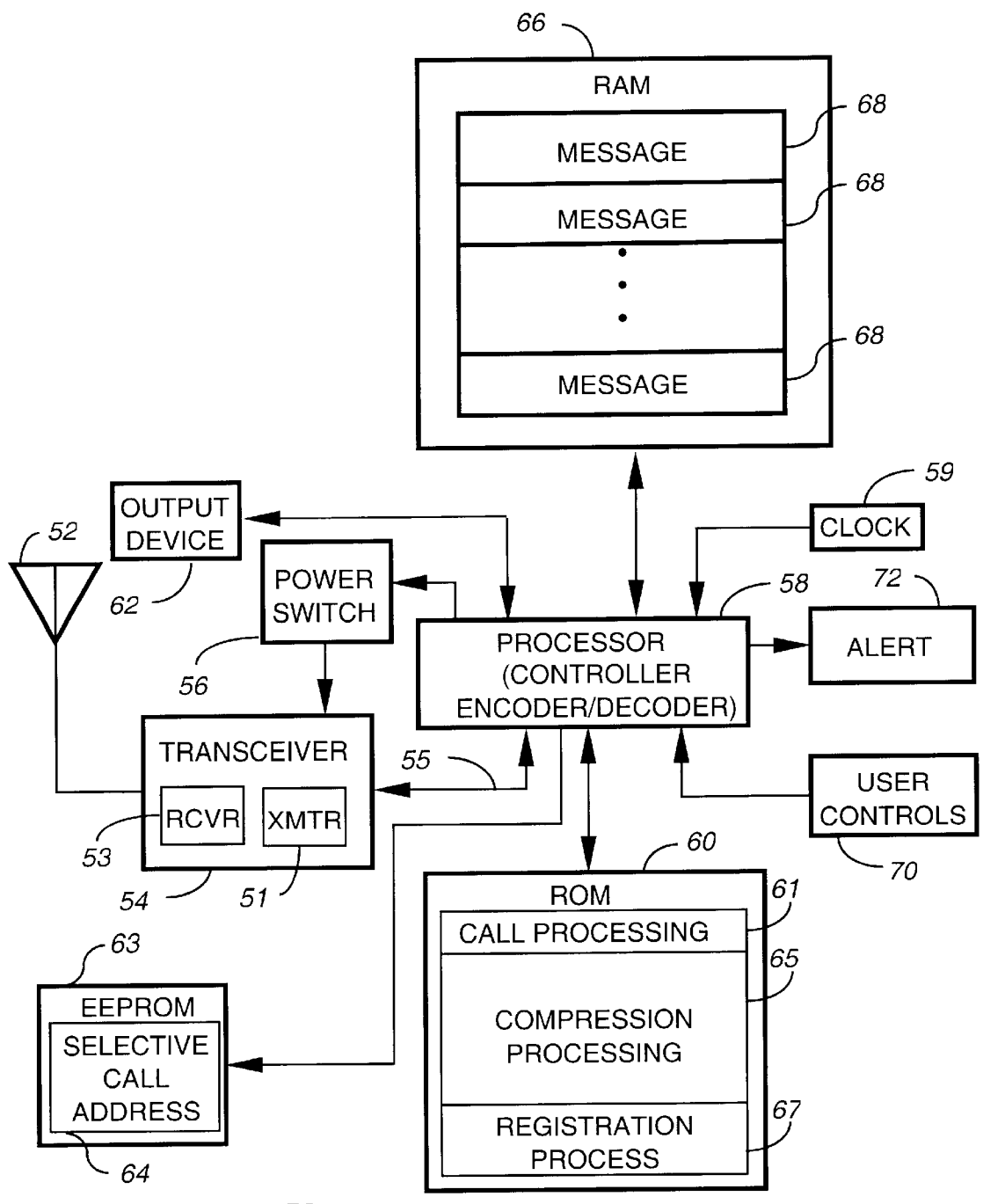
FIG. 1 is a block diagram of a selective call transceiver in accordance with the present invention.

Ideally, in accordance with the present invention, wireless three-way calling or multi-party calling can be achieved without unduly increasing bandwidth requirements. Referring to FIG. 1, a block diagram of a wireless communication device 50 for facilitating communication among simultaneous multiple users is shown in accordance with the present invention. It should be understood that the present invention contemplates various scenarios where a multi-party conversation includes at least one or more parties using a wireless subscriber unit having an adjustable vocoder. Thus, other parties can make calls via public telephone switching networks (PSTNs). The communication device preferably comprises a transceiver antenna 52 for transmitting and intercepting radio signals to and from base stations (not shown). The radio signals linked to the transceiver antenna 52 are coupled to a transceiver 54 comprising a conventional transmitter 51 and receiver 53. The radio signals received from the base stations preferably use modulation techniques suitable for voice communications. It will be appreciated by one of ordinary skill in the art that the transceiver antenna 52 is not limited to a single antenna for transmitting and receiving radio signals. Separate antennas for receiving and transmitting radio signals would also be suitable.

Radio signals received by the transceiver 54 produce demodulated information at the output. The demodulated information is transferred over a signal information bus 55 preferably coupled to the input of a processor or controller 58, which processes the information. Similarly, response messages including acknowledge transmitted messages are processed by the processor 58 and delivered through the signal information bus 55 to the transceiver 54. The processor 58 can operate as an encoder, a decoder or vocoder as needed. Alternatively, a communication device in accordance with the present invention could utilize separate processors for encoding, decoding and controlling other functions of the communication device. Preferably, the controller is programmed to detect the number of N independent calls on the signal and to decode N separate $1/N_i$ rate packets (which when combined would typically fit in a full rate packet) to reconstruct voice signals corresponding to the N independent calls providing reconstructed signals. It should be understood within contemplation of the scope of the invention as claimed that such separate $1/N_i$ rate packets could include various fractional rate packets that sum up to a rate packet of a predefined size, preferably a full rate packet size. For example, the separate rate packets could include one ½ rate packet and two ¼ rate packets. In other words, the summation of $1/N_i$ rate packets would equal to a rate packet of the predefined size where the predefined sized is preferably a full rate packet size and where i=1 to N. In any event, the controller subsequently combines the reconstructed signals prior to providing an audio output.

A conventional power switch 56, coupled to the processor 58, is used to control the supply of power to the transceiver 54, thereby providing a battery saving function. A clock 59 is coupled to the processor 58 to provide a timing signal used to time various events as required in accordance with the present invention. The processor 58 also is preferably coupled to a electrically erasable programmable read only memory (EEPROM) 63 which comprises at least one selective call address 64 assigned to the communication device 50 and used to implement a selective call feature. The processor 58 also is coupled to a random access memory (RAM) 66 for storing the at least a message in a plurality of message storage locations 68. Of course, other information could be stored that would be useful in a two-way communication system.

When an address is received by the processor 58, the call processing element 61 preferably within a ROM 60 compares the received address with at least one selective call addresses 64, and when a match is detected, a call alerting signal is preferably generated to alert a user that a message has been received or that a voice call is being initiated. The call alerting signal is directed to a conventional audible or tactile alert device 72 coupled to the processor 58 for generating an audible or tactile call alerting signal. In addition, the call processing element 61 processes the message preferably received in a digitized conventional manner, and then stores the message in the message storage location 68 in the RAM 66. The message can be accessed by the user through conventional user controls 70 coupled to the processor 58, for providing functions such as reading, locking, and deleting a message in the case of a messaging device. Typically, the voice communication would occur via an input/output device 62 such a speaker and microphone. Alternatively, for retrieving or reading a message, the output device 62 can also be a conventional liquid crystal display (LCD), preferably coupled to the processor 58. It will be appreciated that other types of memory, e.g., EEPROM, can be utilized as well for the ROM 60 or RAM 66 and that other types of output devices can be utilized in place of or in addition to the LCD, particularly in the case of receipt of digitized voice. The ROM 60 also preferably includes elements for handling the registration process (67) and for compression processing (65) among other elements or programs.

Figure 2:
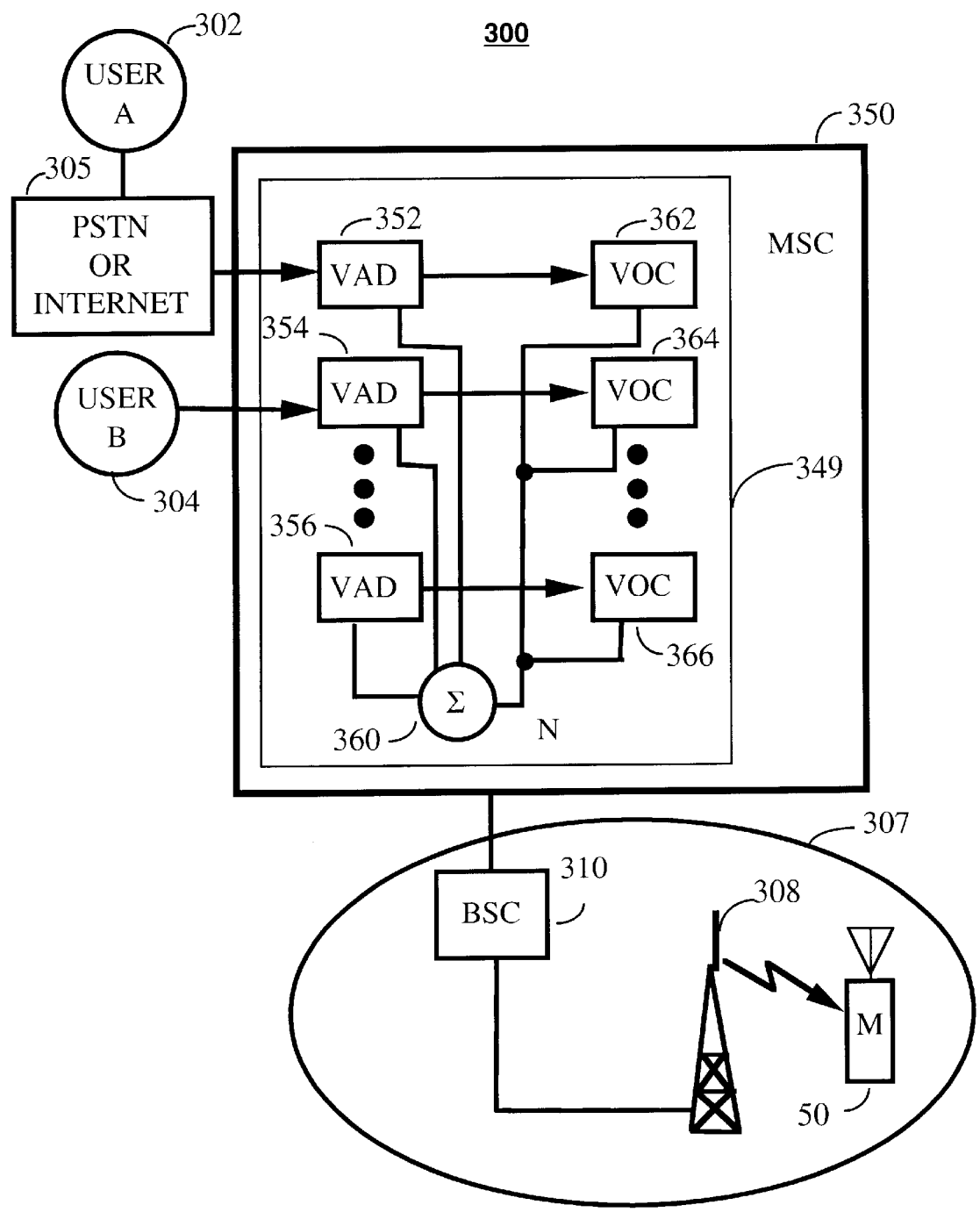
FIG. 2 is a block diagram of a wireless communication system in accordance with the present invention.

Referring to FIG. 2, there is shown a wireless communication system 300 in accordance with the present invention. The system 300 preferably includes user A's device 302 and user B's device 304 which can either be wireless or wireline connected to a mobile switching center (MSC) 350. In this instance, device 302 is wireline connected via block 305 which can be a public switching telephone network, the internet, an intranet or some other wired network coupled to the MSC 350. The MSC 350 couples to a mobile device 50 in a coverage area 307 via a base station controller (BSC) 310 and antenna 308 as shown.

The MSC 350 is shown as the device performing the analysis enabling the ability to adjust rates in vocoders as contemplated in the present invention using voice processing element 349. As will be explained below, it should be understood that such analysis could occur elsewhere. The voice processing element with such capabilities preferably comprises voice activity detection devices 352, 354, through 356 that would detect N separate sources of voice activity. A summation device 360 would sum the number of voices and provide an appropriate input to corresponding N adjustable vocoders (362, 364, through 366) that would allow such vocoders to adjust to an appropriate $1/N_i$ rate (where $1N_i$ can be variable and the sum of the N $1/N_i$ rate packets equals to a rate packet of a predefined size, preferably a full rate packet).

Figure 3:
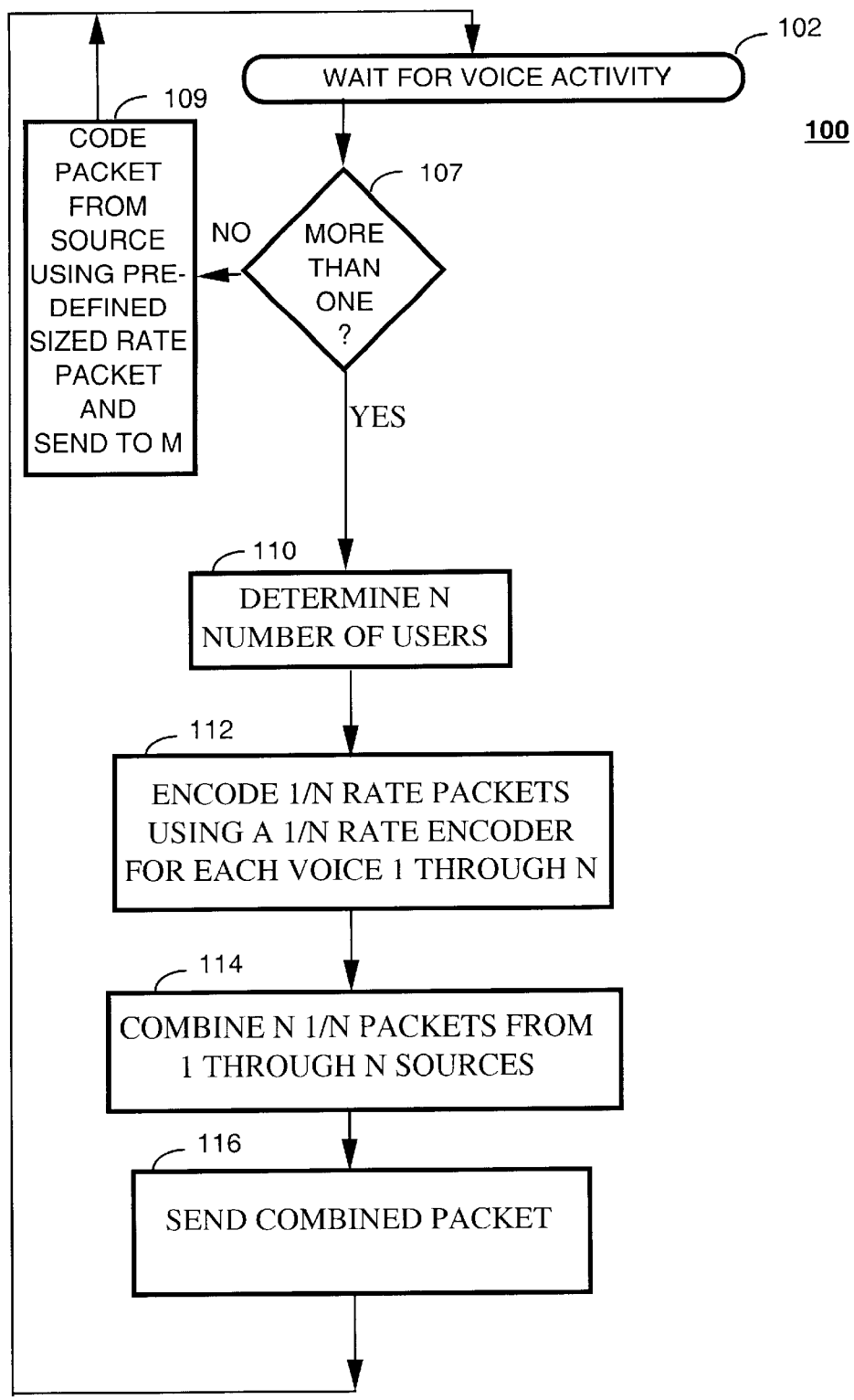
FIG. 3 is a flow chart illustrating a method of bandwidth efficient multi-party calling in accordance with the present invention.

Referring to FIG. 3, a flow chart illustrating a method 100 of bandwidth efficient multi-party calling in accordance with the present invention is shown. Preferably, at least one of the parties in the multiparty call is a user of a wireless subscriber unit using an adjustable vocoder which in essence can be a variable, or scalable, or multi-rate vocoder that is capable of adjusting rates. For a predetermined time period, the method would analyze or monitor for voice activity from a plurality of sources on a given channel. Preferably, this analysis occurs at the MSC 350 shown in FIG. 2, but the analysis could occur elsewhere such as in the BSC 310. Thus, at step 102, the method is merely waiting for voice activity. An analysis period could just include one frame of data, particularly for realtime applications such as voice communications. Once voice activity is detected from among the plurality of sources at the end of an analysis period, it is determined whether the voice is detected from more than one source at decision block 107. If voice activity is only detected from one source, then the voice activity from this source is coded and transmitted using a full-rate packet (or a predefined sized packet as the case may be) of data to a wireless subscriber "M" at block 109. If, at decision block 107, it is determined that there are other sources of voice, then the number of "N" users (or sources) is determined at block 110. Then, at step 112, $1/N_i$ rate packets are encoded using a $1/N_i$ rate encoder for each voice 1 through N. The method proceeds to combine the N $1/N_i$ rate packets from the 1 through N sources at step 114 to form the predefined sized packet or the preferably single full rate packet. The combined packet along with control information indicating the value of N is then sent to "M" using a downlink channel at step 116. The control information may explicitly include values for $1/N_i$, but such values may implicitly be determined from the value of N. Preferably, the voice activity analysis is done on a frame by frame basis allowing for dynamic control with respect to the value of N in order to maximize voice quality in a multiparty call.

If at decision block 104, it is determined that the first source is not from user "A", but another source such as from user "B" or "C" or any other party, then a similar process is followed. If only one user has voice activity at decision block 107, then the voice packet from this other source is coded using a full-data rate and subsequently sent to the mobile subscriber unit "M". If more than one source is found at decision block 107, then steps 110–116 is followed as previously described above.

Figure 4:
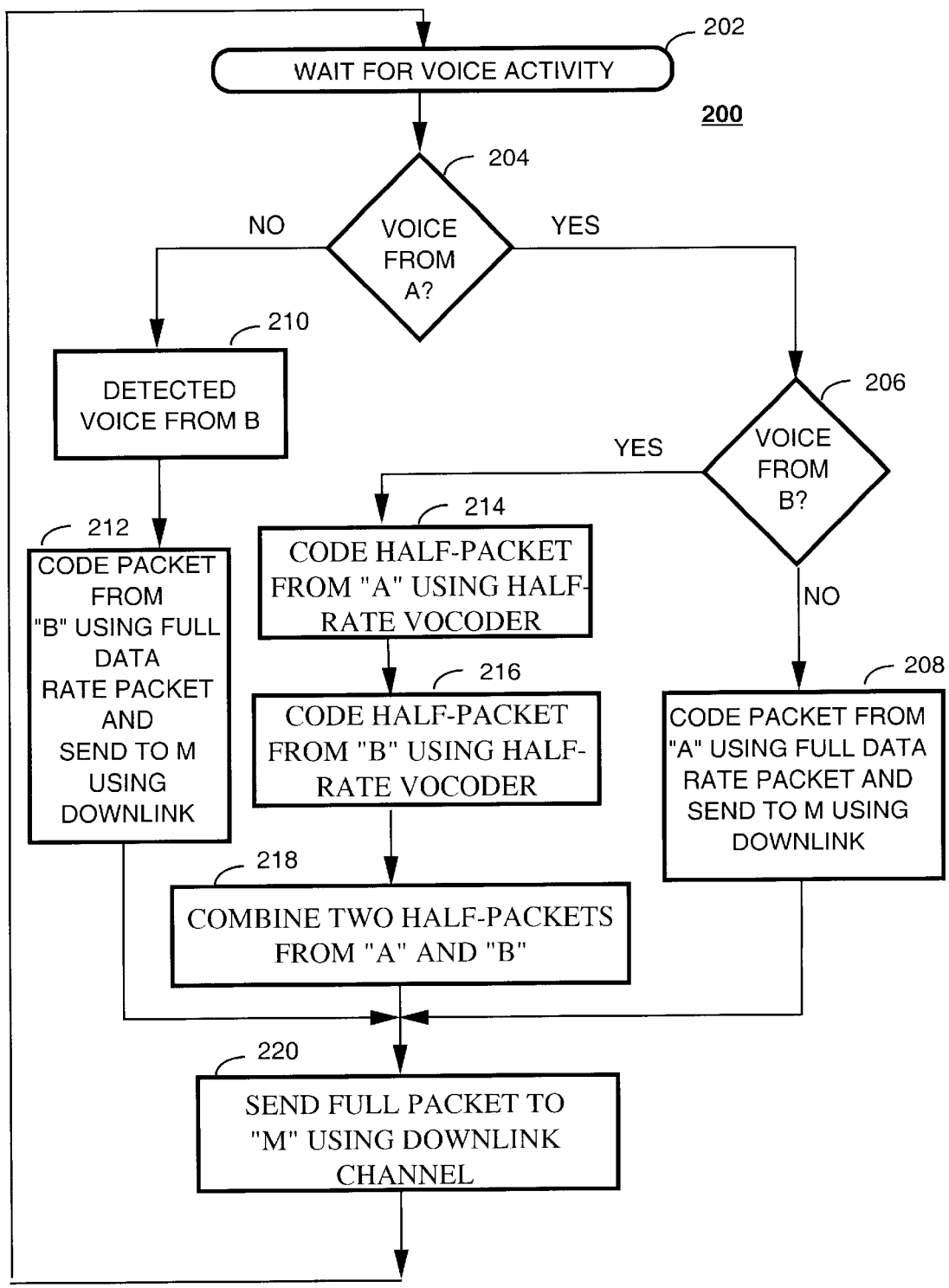
FIG. 4 is a flow chart illustrating a method of bandwidth efficient three-party calling in accordance with the present invention.

Referring to FIG. 4, a flow chart of a more specific example illustrating a method 200 of bandwidth efficient three-party calling is shown in accordance with the present invention. For a predetermined time period, the method would analyze or monitor for voice activity from a plurality of sources on a given channel. Thus, at step 202, the method is merely waiting for voice activity. Once voice activity is detected from among the plurality of sources at the end of an analysis period, it is determined whether the voice is detected from only a first source "A" at decision block 204 or from only a second source "B" at block 210. If voice activity is only detected from "A" as confirmed by decision block 206, then the voice activity from the first source "A" is coded at step 208 and transmitted using a full-rate packet of data to a wireless subscriber "M" at block 220. If voice activity is only detected from a second source "B" at block 210, then the voice activity from the second source "B" is coded at step 212 and transmitted using a full-rate packet of data to a wireless subscriber "M" at block 220. If voice activity is detected from at least a first source (at decision block 204) and at least a second source (at decision block 206), then the method encodes a half-packet of data from at least the first source using a half-rate vocoder at step 214 and then encodes a half-packet of data from at least the second source using a half-rate vocoder at step 216. At step 218, the two half-packets from at least the first source ("A") and the second source ("B") is combined before transmitting a full packet of data to a wireless subscriber unit "M" at block 220. Preferably, the voice activity analysis is done on a frame by frame basis allowing for dynamic control with respect to the value of N in order to maximize voice quality in a multiparty call.

In essence, a method in accordance with the present invention allows for efficient use of bandwidth in a simultaneous call with multiple users where at least one of the users uses a wireless subscriber unit having an adjustable rate vocoder. The subscriber unit with such vocoder would receiver a signal and detect the number of N independent calls on the signal. This can be achieved by decoding an explicit control signal that may be embedded within the signal received by the subscriber unit. The subscriber unit would then decode N separate $1/N_i$ rate packets to reconstruct voice signals corresponding to the N independent calls providing reconstructed signals. The reconstructed signals are then combined prior to providing an audio output to the user. As explained before, the coding rate ($1/N_i$) can be determined explicitly with embedded control information or can alternatively be determined implicitly from the value of N and the predefined packet size. Additional refinements can be made by modifying the coding rate based on the particular frame energy measured in a particular frame.

The above description is intended by way of example only and is not intended to limit the present invention in any way except as set forth in the following claims.

What is claimed is:

1. A bandwidth efficient method of wireless communication among simultaneous multiple users where at least one of the users is a wireless subscriber using an adjustable vocoder, comprising the steps of:

monitoring for voice activity from a plurality of sources on a channel for a predetermined time period;

detecting voice activity among the plurality of sources during the predetermined time period; and if voice activity is detected from only a first source, then coding the voice activity from the first source and transmitting a full-rate packet of data to the wireless subscriber;

if voice activity is detected from at least a first source and a second source amounting to N sources among the plurality of sources, then coding from at least the first source and the second source using a $1/N_i$-rate vocoder to obtain N different $1/N_i$ rate data packets and combining the N $1/N_i$-rate data packets from at least the first source and the second source before transmitting a predefined sized packet of data to the wireless subscriber.

2. The method of claim 1, wherein the step of monitoring further comprises the step of monitoring for voice activity at a mobile switching center.

3. The method of claim 1, wherein the step of monitoring further comprises the step of monitoring for voice activity at a base station controller.

4. The method of claim 1, wherein the step of monitoring further comprises the step of monitoring for a predetermined time comprising the time representing the receipt of one frame of data.

5. The method of claim 1, wherein the step of transmitting the predefined sized packet of data comprises the step of transmitting a full packet of data.

6. The method of claim 1, wherein the step of detecting comprises the step of detecting the number of N independent calls on a frame by frame basis to dynamically control a quality level of an audio output.

7. The method of claim 1, wherein the step of detecting comprises the step of decoding an explicit control signal from the voice activity to determine $1/N_i$.

8. The method of claim 1, wherein the step of detecting comprises the step of implicitly determining the value of $1/N_i$ from the value of N and the predefined sized packet of data.

9. The method of claim 8, wherein the step of implicitly determining the value of $1/N_i$ further includes the step of measuring frame energy on a particular frame.

10. A bandwidth efficient method of wireless communication among simultaneous multiple users where at least one of the users is a wireless subscriber using an adjustable vocoder, comprising the steps of:

monitoring for voice activity from a plurality of sources on a channel for a predetermined time period;

detecting voice activity from a first source among the plurality of sources during the predetermined time period;

if only voice activity is detected from a first source, then coding the voice activity from the first source and transmitting a full-rate packet of data to the wireless subscriber;

if voice activity is detected from a second source among the plurality of sources during the predetermined time period, then coding the voice activity from the second source and transmitting a full-rate packet of data to the wireless subscriber;

if voice activity is detected from at least a first source and a second source among the plurality of sources, then coding from at least the first source and the second source using a half-rate vocoder and combining the half-rate packets from at least the first source and the second source before transmitting a full packet of data to the wireless subscriber.

11. The method of claim 10, wherein the step of monitoring further comprises the step of monitoring for voice activity at a mobile switching center.

12. The method of claim 10, wherein the step of monitoring further comprises the step of monitoring for voice activity at a base station controller.

13. The method of claim 10, wherein the step of detecting comprises the step of detecting the number of N independent calls on a frame by frame basis to dynamically control a quality level of an audio output.

* * * * *